United States Patent
Lipson et al.

(10) Patent No.: US 9,217,830 B2
(45) Date of Patent: Dec. 22, 2015

(54) ELECTRO-OPTIC MODULATOR STRUCTURES, RELATED METHODS AND APPLICATIONS

(75) Inventors: Michal Lipson, Ithaca, NY (US); Sasikanth Manipatruni, Ithaca, NY (US); Long Chen, North Brunswick, NJ (US); Kyle Preston, Ithaca, NY (US)

(73) Assignee: CORNELL UNIVERSITY, Ithaca, NY (US)

( * ) Notice: Subject to any disclaimer, the term of this patent is extended or adjusted under 35 U.S.C. 154(b) by 60 days.

(21) Appl. No.: 13/697,866

(22) PCT Filed: May 13, 2011

(86) PCT No.: PCT/US2011/036422
§ 371 (c)(1),
(2), (4) Date: Nov. 14, 2012

(87) PCT Pub. No.: WO2011/143548
PCT Pub. Date: Nov. 17, 2011

(65) Prior Publication Data
US 2013/0056623 A1    Mar. 7, 2013

Related U.S. Application Data

(60) Provisional application No. 61/334,648, filed on May 14, 2010.

(51) Int. Cl.
*G02F 1/035* (2006.01)
*G02B 6/26* (2006.01)
(Continued)

(52) U.S. Cl.
CPC ........ *G02B 6/29338* (2013.01); *G02B 6/29341* (2013.01); *G02B 6/12007* (2013.01); *G02B 6/136* (2013.01); *G02B 2006/12142* (2013.01); *G02F 1/3133* (2013.01)

(58) Field of Classification Search
CPC ... G02F 1/3133; G02F 1/3134; G02F 1/3132; G02B 6/136; G02B 6/29338; G02B 2006/12142; G02B 6/29341
USPC .......................................................... 385/1–3
See application file for complete search history.

(56) References Cited

U.S. PATENT DOCUMENTS

| 6,393,172 | B1 | 5/2002 | Brinkman et al. |
| 2004/0151463 | A1 | 8/2004 | Talin et al. |
| 2010/0200931 | A1* | 8/2010 | Matocha et al. .............. 257/401 |

FOREIGN PATENT DOCUMENTS

| WO | 0227362 | 4/2002 |
| WO | 2006028477 | 3/2006 |

OTHER PUBLICATIONS

"Micrometre-scale silicon electro-optic modulator," by Xu et al, Nature, vol. 435, No. 19, pp. 325-327, 2005.*
(Continued)

*Primary Examiner* — Robert Tavlykaev
(74) *Attorney, Agent, or Firm* — William Greener; Alek P. Szecsy; Bond, Schoeneck & King, PLLC

(57) ABSTRACT

An electro-optic modulator structure, a method for fabricating the electro-optic modulator structure, a method for operating an electro-optic modulator device that derives from the electro-optic modulator structure and a related communications apparatus that includes the electro-optic modulator structure all are directed towards effecting a comparatively low voltage operation of the electro-optic modulator device predicated upon consideration of optimal charge carrier injection efficiency characteristics of a PIN diode charge carrier injection based micro-ring electro-optic modulator structure as a function of applied bias voltage. To realize the foregoing result, at least in part, the PIN diode charge carrier injection based electro-optic modulator structure includes at least one of a p-doped region and an n-doped region that has a relatively high volume dopant concentration at a surface thereof.

20 Claims, 9 Drawing Sheets

(51) Int. Cl.
  G02B 6/42   (2006.01)
  G02B 6/293  (2006.01)
  *G02B 6/136*   (2006.01)
  *G02B 6/12*    (2006.01)
  *G02F 1/313*   (2006.01)

(56) References Cited

OTHER PUBLICATIONS

"Microring and microdisk resonator integrated circuits on a silicon chip," by Poon et al, Proceedings of SPIE, vol. 6476, p. 647607, 2007.*

"Electrooptical effects in silicon," by Soref et al, IEEE Journal of Quantum Electronics, vol. 23, No. 1, pp. 123-129, 1987.*

"Ring resonator-based electrooptic polymer traveling-wave modulator," by Tazawa et al, Journal of Lightwave Technology, vol. 24, vol. 9, pp. 3514-3519, 2006.*

"Deposited silicon high-speed integrated electro-optic modulator," by Preston et al, Optics Express, vol. 17, No. 7, pp. 5118-5124, published Mar. 17, 2009.*

Koch, Christian et al., Light Source Position Measurement Technique Applicable in SOI Technology, IEEE Journal of Solid-State Circuits, vol. 43, No. 7, Jul. 2008, pp. 1588-1593.

Hong, Seung Moo, PCT International Search Report and Written Opinion, KIPO, Jan. 19, 2012.

* cited by examiner

ELECTRO-OPTIC MODULATOR STRUCTURES, RELATED METHODS AND APPLICATIONS

CROSS-REFERENCE TO RELATED APPLICATION

This application is related to, and derives priority from, U.S. Provisional Patent Application Ser. No. 61/334,648, filed 14 May 2010, and titled Electro-optic Modulator Apparatus and Methods, the contents of which is incorporated herein fully by reference.

STATEMENT OF GOVERNMENT INTEREST

The research that lead to the invention described herein was funded by a National Science Foundation Career grant number 0446571. The U.S. Government has certain rights in this invention.

BACKGROUND OF THE INVENTION

Comparatively low voltage (i.e., less than about 500 mV) operation of electro-optic devices, such as but not limited to electro-optic modulator devices, is an important predicate and avenue that may provide for future bandwidth needs within the context of integration of electro-optic devices and nanoelectronic devices. In particular, an operating voltage of a silicon electro-optic device may desirably scale aggressively as a rail voltage (Vdd) for a related digital silicon nanoelectronic device scales to 600 mV in future anticipated complementary metal oxide semiconductor (CMOS) technology platforms.

In addition, a low voltage swing modulation scheme for an electro-optic modulator device can significantly reduce a total transmitter energy and footprint within an electro-optic circuit that includes the electro-optic modulator device by reducing a drive electronic component complexity in comparison with a drive electronic component complexity for an electro-optic circuit that includes an electro-optic modulator device predicated upon a comparatively high voltage swing modulation scheme.

In accordance with the above, it is thus of great interest to pursue low operating voltage electro-optic devices that are silicon semiconductor material fabrication compatible. Therefore, desirable within the electro-optic structure art and the electro-optic device art are electro-optic structures, methods for fabricating electro-optic structures, methods for operating electro-optic devices that derive from the electro-optic structures and related apparatus that include the electro-optic structures, wherein in particular the electro-optic structures provide for efficient operation of the electro-optic devices at comparatively low operating voltages.

SUMMARY OF THE INVENTION

Embodiments include an electro-optic structure, a method for fabricating the electro-optic structure, a method for operating an electro-optic device that derives from the electro-optic structure and a communications apparatus that includes the electro-optic structure.

A particular exemplary non-limiting embodiment that follows illustrates a gigahertz (GHz) modulation of a photonic signal that is effected using a 2.5 micron radius monocrystalline silicon micro-ring electro-optic charge carrier injection based modulator device (i.e., predicated upon a PIN diode), with only about 150 mV peak-to-peak drive voltage and an electro-optic modal volume of only about 2 cubic microns. This low drive voltage and ultra low switching energy operation of the monocrystalline silicon micro-ring electro-optic charge carrier injection based modulator device are in-part realized by biasing the monocrystalline silicon micro-ring electro-optic charge carrier injection based modulator device near an optimum charge carrier injection efficiency point of the monocrystalline silicon micro-ring electro-optic charge carrier injection based modulator device.

It is believed that this feature of biasing near the optimum charge carrier injection efficiency point is unique to charge carrier injection based modulator devices, thus enabling ultra low voltage operation in contrast with other techniques for fabricating electro-optic modulator structures and operating electro-optic modulator devices that derive from the electro-optic modulator structures.

The embodiments as described in greater detail below provide a class of high circuit speed and low operating voltage electro-optic modulators that may enable seamless integration of silicon electro-optics with low voltage complementary metal oxide semiconductor nanoelectronics.

A particular electro-optic structure in accordance with the embodiments includes an intrinsic semiconductor material waveguide located at least in part contiguous with and extending from a semiconductor material layer located over a substrate. This particular electro-optic structure also includes a first doped region comprising a first dopant type located within at least a portion of the semiconductor material layer on one side of the intrinsic semiconductor material waveguide. This particular electro-optic structure also includes a second doped region comprising a second dopant type different than the first dopant type located within at least a portion of the semiconductor material layer on an opposite side of the intrinsic semiconductor material waveguide, where at least one of the first doped region and the second doped region has a volume concentration of the first dopant type or the second dopant type at the surface of the first doped region or the second doped region of at least about 1e19 dopant atoms per cubic centimeter.

Another particular electro-optic structure in accordance with the embodiments includes a ring waveguide located at least in part contiguous with and extending from a semiconductor material layer located over a substrate. This particular electro-optic structure also includes a strip waveguide located adjacent to the ring waveguide over the substrate. This particular electro-optic structure also includes a first doped region comprising a first dopant type located within at least a portion of the semiconductor material layer inside the ring waveguide. This particular electro-optic structure also includes a second doped region comprising a second dopant type different than the first dopant type located within at least a portion of the semiconductor material layer outside the ring waveguide, where at least one of the first doped region and the second doped region has a volume concentration of the first dopant type or the second dopant type at a surface of the first doped region or the second doped region of at least about 1e19 dopant atoms per cubic centimeter.

A particular method for fabricating the particular electro-optic structure in accordance with the embodiments includes etching while using a first etch method a ring waveguide and an adjacent strip waveguide within an etched semiconductor material layer located over a substrate. The particular method also includes forming a screen layer over the etched semiconductor material layer including at least the ring waveguide and adjoining lower plateau regions within the etched semiconductor material layer. The particular method also includes implanting through the screen layer at least one of: (1) at least a portion of the etched semiconductor material layer inside the ring waveguide with a first dopant of a first dopant type to form a first doped region inside the ring waveguide; and (2) at least a portion of the etched semiconductor material layer outside the ring waveguide with a second dopant of a second dopant type different than the first type to form a second doped region outside the ring waveguide.

A particular method for operating an electro-optic device that derives from the electro-optic structure in accordance with the embodiments includes determining for a PIN diode based electro-optic modulator structure comprising: (1) a ring waveguide comprising an intrinsic semiconductor material located contiguous with and extending from a semiconductor material layer located over a substrate; and (2) a first doped region comprising a first dopant type located within at least a portion of the semiconductor material layer inside the ring waveguide separated from a second doped region comprising a second dopant type different than the first dopant type located within at least a portion of the semiconductor material layer outside the ring waveguide, charge carrier injection efficiency characteristics into the ring waveguide as a function of PIN diode bias voltage. This particular method also includes determining from the charge carrier injection efficiency characteristics a point of optimal charge carrier injection efficiency as a function of PIN diode bias voltage. This particular method also includes operating the PIN diode based electro-optic device at a bias voltage that corresponds with the point of optimal charge carrier injection efficiency.

A particular electro-optic communications apparatus in accordance with the embodiments includes a ring waveguide located at least in part contiguous with and extending from a semiconductor material layer located over a substrate. This particular electro-optic communications apparatus also includes a strip waveguide located adjacent to the ring waveguide over the substrate. This particular electro-optic communications apparatus also includes a first doped region comprising a first dopant type located within at least a portion of the semiconductor material layer inside the ring waveguide. This particular electro-optic communication apparatus also includes a second doped region comprising a second dopant type different than the first dopant type located within at least a portion of the semiconductor material layer outside the ring waveguide, where the first doped region and the second doped region are adapted to receive an analog electrical signal in addition to a bias voltage.

Within the embodiments and the invention as claimed, a "bias voltage" is intended as a constant base voltage applied to electrodes within a PIN diode within a charge carrier injection based micro-ring electro-optic modulator structure in accordance with the embodiments to secure operation or optimize operation of a charge carrier injection based micro-ring electro-optic modulator device that results from the corresponding structure.

Within the embodiments and the invention as claimed, an "operating voltage" or a "swing voltage" or a "voltage swing" is intended as a variable signal voltage that is combined with the "bias voltage" at the PIN diode electrodes as described above to provide for signal modulation and/or transmission when using the charge carrier injection based micro-ring electro-optic modulator device in accordance with the embodiments.

BRIEF DESCRIPTION OF THE DRAWINGS

FIG. 2b illustrates the surface silicon layer;

FIG. 2c illustrates another lithography process step used to cover the micro-ring electro-optic modulator region of the etched surface silicon layer to provide a twice etched surface silicon layer slab;

FIG. 2d shows a conformal passivation layer located and formed (i.e., either grown or deposited) upon the twice etched surface silicon layer;

FIG. 2e shows portions of the twice etched surface silicon layer slab implanted with a p-dopant;

FIG. 2f shows a pair of metal silicide forming metal layers, one each located and formed upon a p-doped region and an n-doped region;

FIG. 2g shows the results of thermally annealing the micro-ring electro-optic modulator structure of FIG. 2(f);

FIG. 2h shows a cladding layer located and formed upon the micro-ring electro-optic modulator structure of FIG. 2(g);

FIG. 2i shows a plurality of vias V located and formed through the cladding layer to provide a patterned cladding layer;

FIG. 2j illustrates a plurality of contact pads located and formed into the plurality of vias V;

DETAILED DESCRIPTION OF THE EMBODIMENTS

Figure 1A:
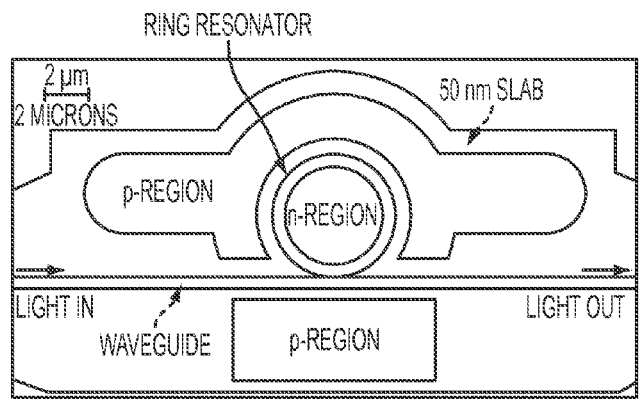
FIG. 1a shows a schematic plan-view of the micro-ring electro-optic modulator structure formed with a 2.5 micron radius micro-ring electro-optic waveguide, according to a non-limiting, illustrative embodiment of the invention.

The embodiments include an electro-optic structure, a method for fabricating the electro-optic structure, a method for operating an electro-optic device that derives from the electro-optic structure and a communications apparatus that includes the electro-optic structure. Each of the foregoing structure, methods and apparatus is predicated upon a low operating voltage charge carrier injection based micro-ring electro-optic modulator structure and device whose low operating voltage characteristics derive from: (1) structural features that provide a low contact resistance and low series resistance in operation of the charge carrier injection based micro-ring electro-optic modulator device; in conjunction with (2) selection of an optimal (i.e., maximized) charge carrier injection efficiency point as a function of applied bias voltage (i.e., dQ/dV) of the charge carrier injection based micro-ring electro-optic modulator device.

While the description that follows describes a PIN diode charge carrier injection based micro-ring electro-optic modulator structure and related methods as fabricated using a silicon-on-insulator substrate, the embodiments are not necessarily intended to be so limited. Rather, the embodiments are intended to include PIN diode charge carrier injection based electro-optic modulator structures that utilize for a PIN diode component semiconductor materials including but not limited to silicon semiconductor materials, germanium semiconductor materials, silicon-germanium alloy semiconductor materials and various compound semiconductor materials such as but not limited to gallium arsenide compound semiconductor materials and indium phosphide compound semiconductor materials. Likewise, while the description that follows describes a PIN diode charge carrier injection based micro-ring electro-optic modulator structure, alternative geometries in comparison with a ring geometry are also contemplated within the context of the embodiments. Such alternative geometries may include, but are not necessarily limited to, waveguide geometries, interferometer geometries and surface-normal geometries.

The description that follows will first describe the structural features and fabrication methodology of the charge carrier injection based micro-ring electro-optic modulator structure in accordance with the embodiments. Next, the description that follows will describe a theory of operation of the charge carrier injection based micro-ring electro-optic modulator device in accordance with the embodiments. Next, the description that follows will describe ultra low voltage swing modulation characteristics of the charge carrier injection based micro-ring electro-optic modulator device in accordance with the embodiments. Next, the description that follows will describe direct digital complementary metal oxide semiconductor charge carrier injection based micro-ring electro-optic modulator devices. Finally, after a summary of the foregoing, the description that follows will describe a radio frequency over fiber application of the charge carrier injection based micro-ring electro-optic modulator structure and device in accordance with the embodiments.

1. Structural Features and Fabrication Methodology of Micro-Ring Electro-Optic Modulator Structure A micro-ring electro-optic modulator structure in accordance with the embodiments was fabricated using a micro-ring of radius 2.5 microns, which was intended as being close to a bending loss limited footprint of a micro-ring within a micro-ring electro-optic modulator device, in order to minimize both the energy requirements and the drive current requirements of a micro-ring electro-optic modulator device that results from operation of the micro-ring electro-optic modulator structure.

As is illustrated in FIG. 1(a), a ring resonator PIN diode based electro-optic structure and related device in accordance with the embodiments includes an intrinsic ring waveguide optically coupled with an intrinsic strip waveguide at an optical coupling location. The ring resonator PIN diode based electro-optic structure and related device in accordance with the embodiments also includes an n-doped region interior to the intrinsic ring waveguide. The ring resonator PIN diode based electro-optic structure and related device also includes a first p-doped region surrounding the intrinsic ring waveguide on one side of the strip waveguide and a second p-doped region adjacent the optical coupling region on the side of the intrinsic strip waveguide opposite the intrinsic ring waveguide. Thus as illustrated in FIG. 1(a) inherently the intrinsic ring waveguide and the portion of the intrinsic strip waveguide at the optical coupling location comprise an intrinsic portion of a PIN diode that includes the n-doped region and the p-doped regions as electrodes.

Figure 1B:
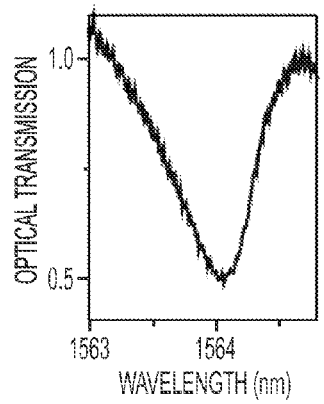
FIG. 1b shows a mode of polarized incoming light, the optical transmission spectrum is normalized to non-resonant transmission of the micro-ring electro-optic modulator device, according to a non-limiting, illustrative embodiment of the invention.

As is illustrated in the schematic plan-view diagram of FIG. 1(a), the micro-ring electro-optic modulator structure is formed with a 2.5 micron radius micro-ring electro-optic waveguide (i.e., a ring waveguide) of linewidth about 500 nanometers (i.e., within a range from about 400 to about 600 nanometers) coupled by a separation distance of about 150 nanometers (i.e., within a range from about 50 to about 300 nanometers) with a nominally linear input and output optical strip waveguide of linewidth about 350 nanometers (i.e., within a range from about 300 to about 400 nanometers). A transmission spectrum of the micro-ring electro-optic modulator device that derives from operation of the micro-ring electro-optic modulator structure of FIG. 1(a) for TE mode polarized incoming light is shown in FIG. 1(b). The optical transmission spectrum of FIG. 1(b) is normalized to non-resonant transmission of the micro-ring electro-optic modulator device.

Figure 2A:
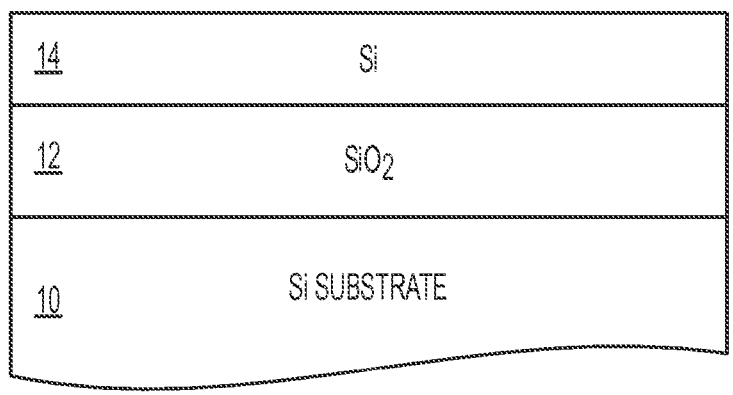
FIG. 2a, FIG. 2b, FIG. 2c, FIG. 2d, FIG. 2e, FIG. 2f, FIG. 2g, FIG. 2h, FIG. 2i and FIG. 2j show a series of cross-sectional schematic diagrams illustrating a micro-ring electro-optic modulator structure using a silicon-on-insulator (S01) substrate fabricated in accordance with an embodiment of the invention.

The micro-ring electro-optic modulator structure in accordance with the embodiments as illustrated in FIG. 1(a) may in particular be fabricated using a silicon-on-insulator (SOI) substrate as is illustrated in FIG. 2(a). The silicon-on-insulator substrate of FIG. 2(a) comprises: (1) a base silicon substrate 10 which is typically comprises a monocrystalline silicon material; (2) a buried oxide (or other dielectric) layer 12 located and formed upon the base silicon substrate 10; and (3) a surface silicon layer 14, which typically also comprises a monocrystalline silicon material, located and formed upon the buried oxide layer 12. The silicon-on-insulator substrate that is illustrated in FIG. 2(a) is otherwise generally conventional in the microelectronic fabrication art, and in particular the optoelectronic fabrication art. Typically: (1) the buried oxide layer 12 has a thickness from about 1000 to about 5000 nanometers with about 3000 nanometers being particularly common for use when fabricating optoelectronic structures and optoelectronic devices; and (2) the surface silicon layer 14 has a thickness from about 200 to about 500 nanometers, with about 260 nanometers being particularly common and desirable within the context of the embodiments.

Figure 2B:
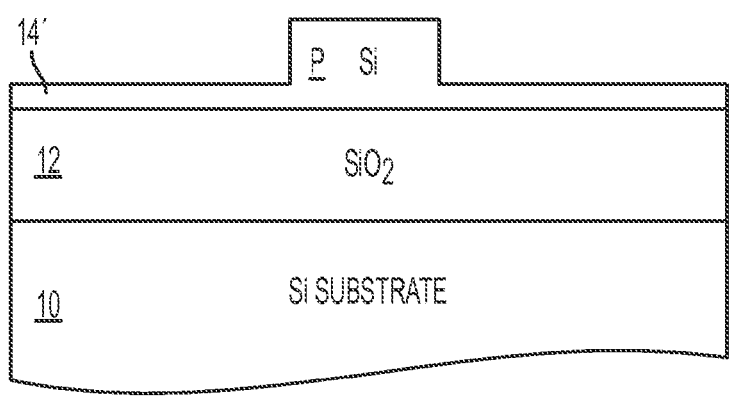
Figure 2C:
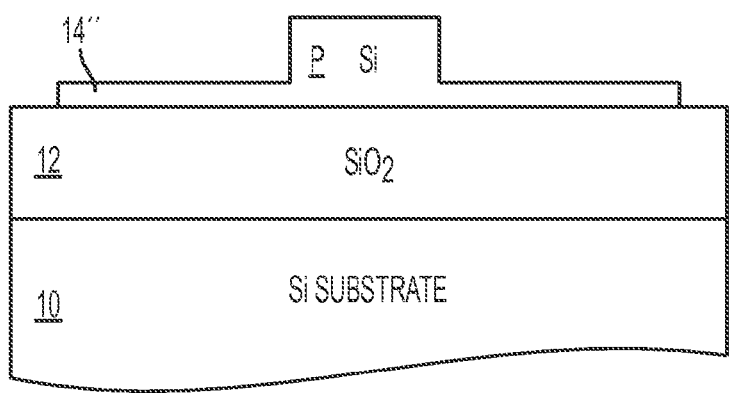

As is illustrated within the schematic cross-sectional diagram of FIG. 2(b), the surface silicon layer 14 that is illustrated within the silicon-on-insulator substrate of FIG. 2(a) may be partially etched to provide a pillar P that is intended as illustrative of a micro-ring cross-section within a micro-ring electro-optic modulator structure in accordance with the embodiments, where the pillar P is located and formed within an etched surface silicon layer 14'. A height of the pillar P is about 200 to about 220 nanometers, and typically about 210 nanometers, above a surrounding lower plateau of the etched surface silicon layer 14'.

Although not specifically illustrated within the schematic cross-sectional diagram of FIG. 2(*b*), the surface silicon layer 14 (i.e., which is typically about 260 nm thick) within a silicon-on-insulator semiconductor substrate may be used for both a passive input and output strip waveguide within the micro-ring electro-optic modulator structure as illustrated within the schematic plan-view diagram of FIG. 1(*a*), as well as for an electro-optic micro-ring waveguide within the micro-ring electro-optic modulator structure as illustrated within the schematic plan-view diagram of FIG. 1(*a*).

To form the micro-ring electro-optic modulator structure of FIG. 2(*b*) from the silicon-on-insulator substrate structure of FIG. 2(*a*), the partial etching step may be undertaken using electron-beam lithography for forming an appropriate mask layer, although such is not necessarily a limitation of the embodiments. Rather, the surface silicon layer 14 within the silicon-on-insulator substrate of FIG. 2(*a*) may be partially etched to provide the etched surface silicon layer 14' including the pillar P within the micro-ring electro-optic modulator structure of FIG. 2(*b*) using lithographic methods including but not limited to photolithographic methods and electron beam lithographic methods. In addition, either of the foregoing lithographic methods may utilize resist materials including but not limited to positive resist materials, negative resist materials and hybrid resist materials. As is illustrated within the schematic cross-sectional diagram of FIG. 2(*b*), either a passive input and output monocrystalline silicon strip waveguide or a monocrystalline silicon micro-ring waveguide within a micro-ring electro-optic modulator structure in accordance with the embodiments is partially etched into a surface silicon layer 14' to provide a height of the pillar P of about 210 nanometers.

As is illustrated within the schematic cross-sectional diagram of FIG. 2(*c*), another lithography process step is used to cover the micro-ring electro-optic modulator region of the etched surface silicon layer 14' and continue the etching of the etched surface silicon layer 14' to provide a twice etched surface silicon layer 14" slab having a thickness about 50 nanometers with the pillar P extending the additional 210 nanometers within the twice etched surface silicon layer 14" slab. Within the embodiments, the additional patterning of the etched surface silicon layer 14' to provide the twice etched surface silicon layer 14" slab is intended to provide for isolation of individual micro-ring electro-optic modulator structures from each other, and from other structures that may be located and formed within the same substrate as the micro-ring electro-optic modulator structure in accordance with the embodiments.

As is illustrated within FIG. 2(*d*), after the additional etching of the etched surface silicon layer 14' to form the twice etched surface silicon layer 14" slab that still includes the pillar P, a conformal passivation layer 16 is located and formed (i.e., either grown or deposited) upon the twice etched surface silicon layer 14" slab including the pillar P. This particular conformal passivation layer 16 may comprise any of several passivation materials, and in particular dielectric passivation materials, that may be readily grown or deposited, such as but not limited to silicon oxide dielectric passivation materials, silicon nitride dielectric passivation materials and silicon oxynitride dielectric passivation materials, but typically comprises a silicon oxide dielectric passivation material that has a thickness from about 15 to about 25 nanometers, and more particularly about 20 nanometers.

As is illustrated within the schematic cross-sectional diagram of FIG. 2(*e*), portions of the twice etched surface silicon layer 14" slab separated by the pillar P (and also optionally but not necessarily laterally recessed from the pillar P sidewalls by a lateral separation distance from about 200 to about 2000 nanometers) are ion implanted with either: (1) a p-dopant to provide a p-doped region 18*a* (i.e., preferably on the outside of a micro-ring within a micro-ring electro-optic modulator structure, while using a boron difluoride or appropriate alternative dopant at a dose of about 3e15 ions per square centimeter and an ion implantation energy about 45 keV); or (2) an n-dopant to provide an n-doped region 18*b* (i.e., preferably on the inside of the micro-ring within the micro-ring electro-optic modulator structure, while using a phosphorous or appropriate alternative dopant at a dose of about 2e15 ions per square centimeter and an ion implantation energy of about 33 keV). As a result of the foregoing preferred ion implantation conditions, the p-doped region 18*a* preferably includes at least a portion of the twice etched surface silicon layer 14" slab outside the micro-ring within the micro-ring electro-optic modulator structure and the n-doped region 18*b* preferably includes at least a portion of the twice etched surface silicon layer 14" slab inside the micro-ring within the micro-ring electro-optic modulator structure, within the micro-ring electro-optic modulator structure as illustrated in FIG. 2(*e*).

Subsequent to implanting the pertinent portions of the twice etched surface silicon layer 14" slab to provide the p-doped region 18*a* and the n-doped region 18*b* optionally and preferably, but not necessarily, laterally recessed from the pillar P sidewalls, the micro-ring electro-optic modulator structure whose schematic cross-sectional diagram is illustrated in FIG. 2(*e*) is preferably thermally annealed at a temperature from about 900 to about 1100 degrees centigrade (and commonly at about 1000 degrees centigrade) for a time period from about 5 to about 30 seconds (and commonly about 15 seconds). Alternatively, an operational but not necessarily optimal electro-optic structure in accordance with the embodiments may also be realized at a relatively low thermal annealing temperature of about 650 degrees centigrade (i.e., generally from about 600 to about 700 degrees centigrade) for a time period of about 120 seconds (i.e., generally from about 100 to about 140 seconds), generally within a rapid thermal annealing (RTA) apparatus, for purposes of activating the dopants within the p-doped region 18*a* and the n-doped region 18*b*, while simultaneously repairing and recrystallizing any amorphization damage to the twice etched surface silicon layer 14" slab.

As is understood by a person skilled in the art, the conformal passivation layer 16 that is illustrated within the schematic cross-sectional diagram of FIG. 2(*e*) functions as a screen layer with respect to ion implantation of the p-doped region 18*a* and the n-doped region 18*b* (or at least one of the foregoing regions). Thus, due to the presence of the conformal passivation layer 16, and with proper adjustment of the ion implantation parameters (and also assuming proper dopant activation), it is possible to provide at least one, and preferably both, of the p-doped region 18*a* and the n-doped region 18*b* with a generally high volume dopant concentration at a surface of the p-doped region 18*a* or the n-doped region 18*b* (and also within lower lying portions of the p-doped region 18*a* and the n-doped region 18*b*) that is desirable for forming low contact resistance connections to a low series resistance PIN diode that includes the p-doped region 18a, the intrinsic silicon pillar P and the n-doped region 18b. Typically and preferably, such a generally high volume dopant concentration at the surface of the p-doped region 18a or the n-doped region 18b (and lower lying portions of the p-doped region 18a and the n-doped region 18b) is at least about 1e19 (i.e., $10^{19}$) dopant atoms per cubic centimeter, and more typically from about 5e19 (i.e., $5 \times 10^{19}$) to about 2e20 (i.e., $2 \times 10^{20}$) dopant atoms per cubic centimeter, which may be readily activated in accordance with the thermal annealing conditions described above to provide a correlating activated dopant carrier concentration.

Figure 2D:
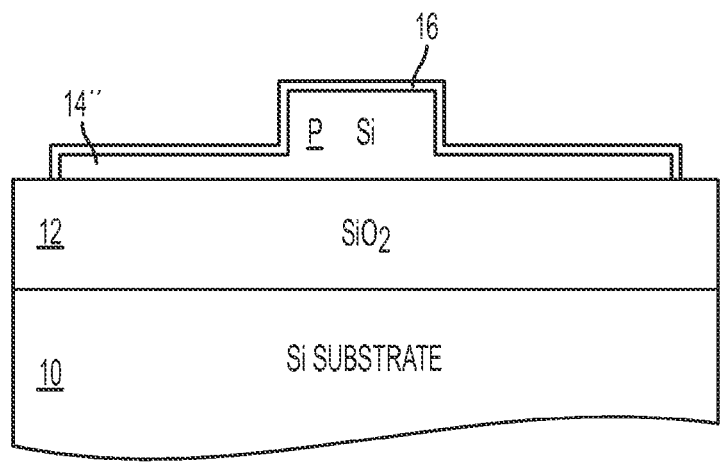
Figure 2E:
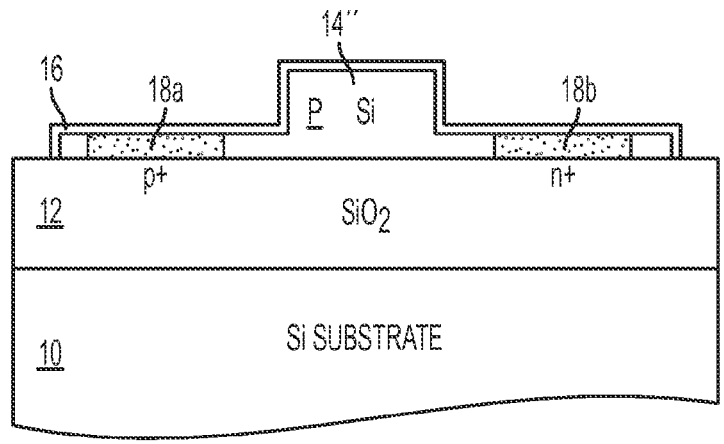
Figure 2F:
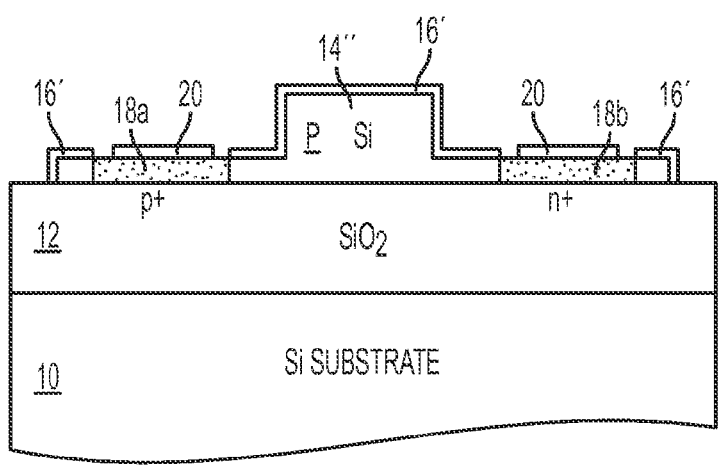

As is illustrated within the schematic cross-sectional diagram of FIG. 2(f), the conformal passivation layer 16 is patterned to form a patterned conformal passivation layer 16' that exposes the p-doped region 18a and the n-doped region 18b, but not the pillar P. Such patterning may be effected using methods and materials that are otherwise generally conventional in the microelectronic fabrication art, and in particular the optoelectronic fabrication art, and will typically but not necessarily include photolithographic and etch methods, such as but not limited to reactive ion etch methods.

FIG. 2(f) also shows a pair of metal silicide forming metal layers 20, one each located and formed upon the p-doped region 18a and the n-doped region 18b. The metal silicide forming metal layers 20 may comprise any of several metal silicide forming metals, including but not limited to nickel, cobalt, titanium, tungsten and tantalum metal silicide forming metals. Typically and preferably, the metal silicide forming metal layers 20 comprise a nickel metal silicide forming metal located and formed upon the p-doped region 18a and the n-doped region 18b (or alternatively as a blanket layer deposition) to a thickness generally from about 10 to about 20 nanometers, with 15 nanometers being more common.

Figure 2G:
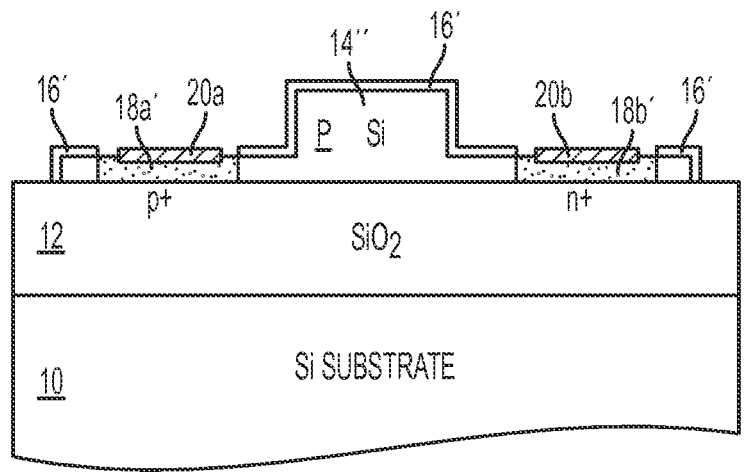

FIG. 2(g) shows the results of thermally annealing the micro-ring electro-optic modulator structure of FIG. 2(f) to form from the metal silicide forming metal layers 20 in conjunction with the p-doped region 18a and the n-doped region 18b a metal silicide layer 20a located and formed upon a p-doped region 18a' and a metal silicide layer 20b located and formed upon an n-doped region 18b'. The foregoing thermal annealing is undertaken for a time period of about 50 seconds (i.e., generally from about 40 to about 60 seconds) and at a temperature of about 550 degrees centigrade (i.e., generally from about 500 to about 600 degrees centigrade) to form the metal silicide layers 20a and 20b located and formed, respectively, upon the p-doped region 18a' and the n-doped region 18b'.

Figure 2H:
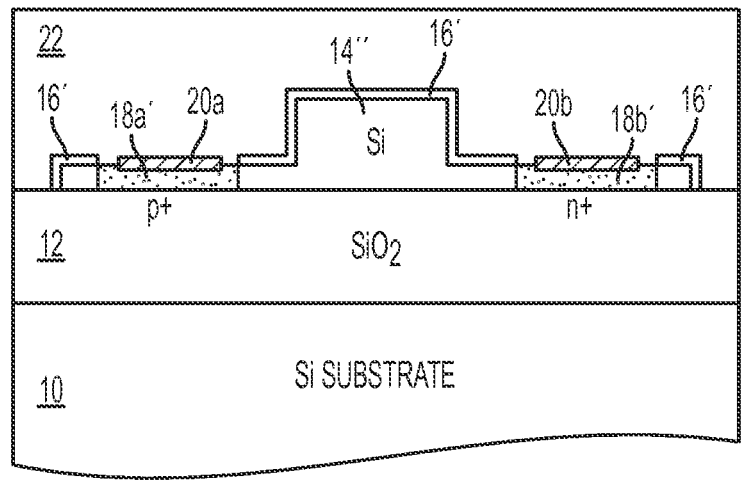

FIG. 2(h) shows a cladding layer 22 located and formed upon the micro-ring electro-optic modulator structure of FIG. 2(g). The cladding layer 22 may also comprise a cladding material as is otherwise generally conventional in the microelectronic fabrication art, including in particular the optoelectronic fabrication art. Typically and preferably, although not necessarily exclusively, the cladding layer 22 also comprises a dielectric cladding material such as but not limited to a silicon oxide dielectric cladding or passivation material, although other cladding or passivation dielectric materials are not precluded. As is illustrated within the schematic cross-sectional diagram of FIG. 2(h), the pillar P within the twice etched silicon surface layer 14" slab is sequentially clad with both the conformal passivation layer 16' and the planarized cladding layer 22. Typically and preferably the cladding layer 22 is located and formed upon the micro-ring electro-optic modulator structure of FIG. 2(g) to provide the micro-ring electro-optic waveguide structure of FIG. 2(h) with the cladding layer 22 of thickness about 1 micron, although other operative thicknesses are not precluded.

Figure 2I:
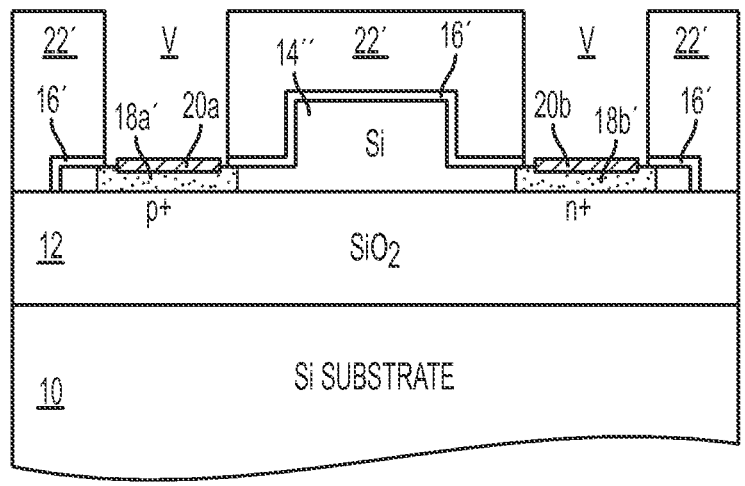

FIG. 2(i) shows a plurality of vias V located and formed through the cladding layer 22 to provide a patterned cladding layer 22' that in turn exposes the metal silicide layers 20a and 20b at the base of the vias V. The plurality of vias V may be formed through the cladding layer 22 to provide the patterned cladding layer 22' that exposes the metal silicide layers 20a and 20b while using methods and materials that are otherwise generally conventional in the microelectronic fabrication art, and in particular the optoelectronic fabrication art. Typically and preferably, the plurality of vias V is formed using a photolithographic and etch method analogous to the photolithographic and etch method that is used to form the conformal passivation layer 16' that is illustrated in FIG. 2(e) from the conformal passivation layer 16 that is illustrated in FIG. 2(d).

Figure 2J:
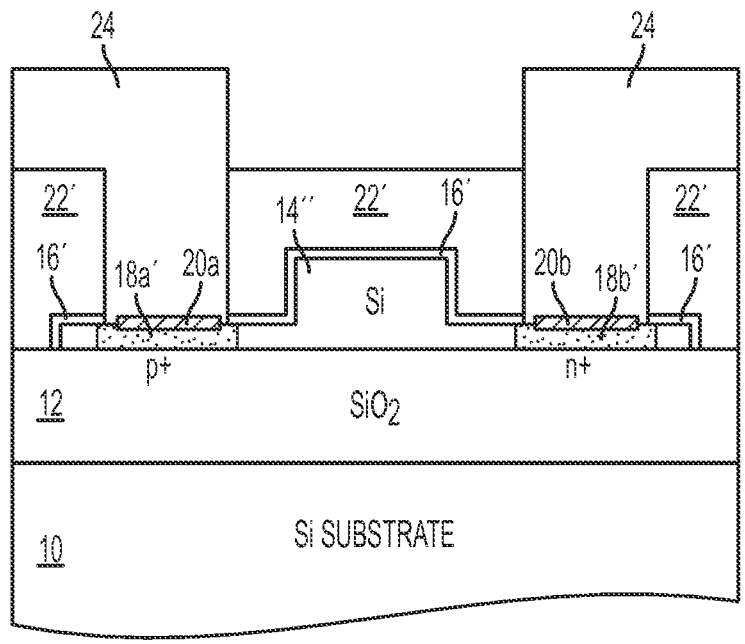

FIG. 2(j) finally illustrates a plurality of contact pads 24 located and formed into the plurality of vias V and contacting the metal silicide layers 20a and 20b, and also bridging to the top surfaces of the patterned cladding layer 22'. The plurality of contact pads 24 may be formed using methods and materials that are otherwise generally conventional in the microelectronic fabrication art, and in particular within the optoelectronic fabrication art. Typically and preferably, the plurality of contact layers 24 may comprise contact materials including but not limited to aluminum, aluminum alloy, copper and copper alloy contact materials located and formed upon the metal silicide layers 20a and 20b and filling the vias V to a thickness from about 1000 to about 3000 nanometers.

Subsequent to fabricating a micro-ring electro-optic modulator in accordance with the process flow schematic cross-sectional diagrams as illustrated in FIG. 2(a) to FIG. 2(j) while using the nominally preferred dimensions and process conditions as disclosed above, a sample chip including a micro-ring electro-optic modulator structure was then diced and facet-polished to sub-wavelength roughness for further electro-optical testing and analysis.

FIG. 2(a) to FIG. 2(j) show a series of schematic cross-sectional diagrams illustrating the results of progressive process steps in fabricating a micro-ring electro-optic modulator structure in accordance with the embodiments. Such a micro-ring electro-optic modulator structure is fabricated in such a fashion to provide for low contact resistance and low series resistance connections to and within a PIN diode within the micro-ring electro-optic modulator structure that allows for an optimized charge carrier injection efficiency point when operating a micro-ring electro-optic modulator device that derives from the micro-ring electro-optic modulator structure.

Figure 1C:
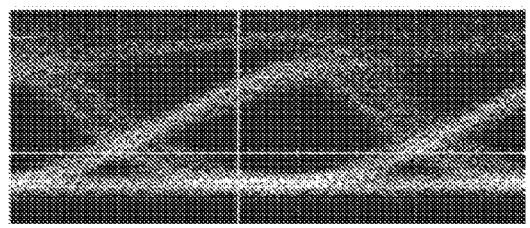
FIG. 1c shows a micro-ring electro-optic modulator device waveform for a micro-ring electro-optic modulator structure fabricated in accordance with an embodiment of the invention.
Figure 1D:
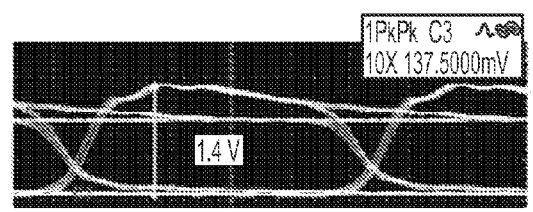
FIG. 1d shows a Non-Return-to-Zero (NRZ) modulation waveform for the micro-ring electro-optic modulator fabricated in accordance with an embodiment of the invention.

A micro-ring electro-optic modulator device waveform for a micro-ring electro-optic modulator structure fabricated in accordance with the embodiments located and formed upon a chip as diced and polished is shown in FIG. 1(c), and a Non-Return-to-Zero (NRZ) modulation waveform for the micro-ring electro-optic modulator fabricated in accordance with the embodiments is shown in FIG. 1(d). With respect to FIG. 1(d), the micro-ring electro-optic modulator was driven with NRZ data at 4 Gbit/second with a peak-peak voltage of 1.4 V biased at 0.5 V. An optical transmission was measured through the micro-ring electro-optic modulator device using an inverse tapered waveguide to fiber couplers at both ends of a chip upon which was fabricated the micro-ring electro-optic modulator structure in accordance with the embodiments.

An insertion loss of a modulator comprising a short section of a coupling strip waveguide and a micro-ring is expected to be less than about 0.1 dB. A fiber to fiber insertion loss is about 15 dB, dominated by the fiber to waveguide coupling losses and the waveguide insertion loss.

2. Principle of Operation for Ultra Low Voltage Swing in Charge Carrier Injection Modulators Very low voltage swing operation of a PIN diode charge carrier injection based micro-ring electro-optic modulator in accordance with the embodiments may be effected by operating such a modulator near an optimum charge carrier injection efficiency point.

Figure 3:
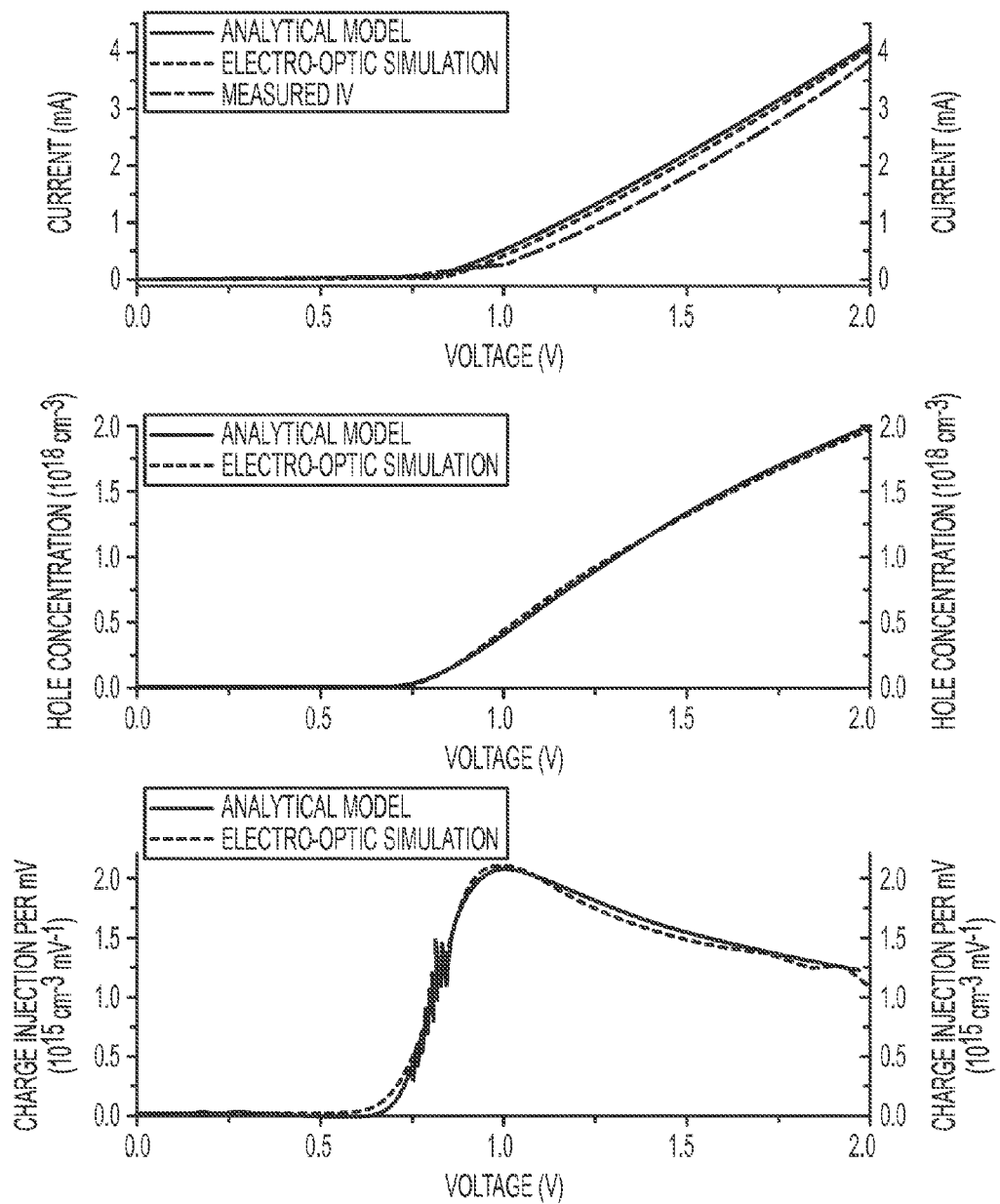
FIG. 3 shows a graph of modeled, simulated and measured current-voltage (IV) characteristics of a micro-ring electro-optic modulator device in accordance with an embodiment.

FIG. 3 (i.e., the top graph in FIG. 3) shows a graph of modeled, simulated and measured current-voltage (IV) characteristics of a micro-ring electro-optic modulator device in accordance with the embodiments. The modeled and simulated current-voltage characteristics are coincident while the measured current-voltage characteristics (i.e., measured current I at applied bias voltage V) are encompassed by the lower lying curve which closely parallels the modeled and simulated current-voltage characteristics. A proposed mechanism for optical modulation within a micro-ring electro-optic modulator device in accordance with the embodiments is a free carrier dispersion due to an electron/hole concentration in a center of a micro-ring waveguide that comprises the micro-ring electro-optic modulator device, which is shown in FIG. 3 (i.e., the middle graph in FIG. 3, where the modeled and simulated free hole carrier dispersion characteristics are coincident) as a function of voltage. A slope of this curve may be defined as a charge carrier injection efficiency per volt (i.e., dQ/dV) as shown in FIG. 3 (i.e., the bottom graph in FIG. 3, where, again, the modeled and simulated characteristics are coincident). As is illustrated within the graph of FIG. 3, bottom graph, there is clearly an optimal charge carrier injection efficiency point around a bias voltage of about 1V. At such an optimal charge carrier injection efficiency point a change in bias voltage of only about 100 mV produces a relatively large change in charge carrier concentration of about 2e17 per cubic centimeter inside a micro-ring waveguide. In turn, this corresponds with a refractive index change of a monocrystalline intrinsic silicon material from which may be comprised the micro-ring waveguide of Δn about 7.7e-4.

The presence of an optimum charge carrier injection efficiency point or region when operating a micro-ring electro-optic modulator device in accordance with the embodiments is believed to be due to the behavior of a charge carrier lifetime, which may be illustrated within the context of an analytic model that may be further supported by charge carrier electro-optic device simulations. The charge carrier electro-optic device simulations are in-turn validated against experimental steady state and transient performance of a micro-ring electro-optic modulator device in accordance with the embodiments. As a starting point for such an analysis, a charge injected into a PIN diode can be extracted from the following non-linear governing equation 1.

$$V(I) = V_t + IR + (kT/e\alpha)\log_e[I/I_o + 1] \quad (1)$$

Within equation 1, I is a steady state current through a PIN diode, R is a total effective series resistance, k is the Boltzmann constant, α is a non-ideality coefficient of the PIN diode and $I_o$ is a reverse saturation current.

Within FIG. 3, top graph there may be considered within the context of the measured IV data an analytical solution of the above equation, along with simulated IV data and measured IV data that are provided for comparison purposes. The fitting parameters that are used (or obtained) within FIG. 3, top graph to secure the analytical solution of the above equation are $I_o$=90 nA, $V_t$=0.5 V, α=0.62 and R=250 ohms. The injected charge carrier density can be obtained from the V(I) characteristics of FIG. 3, top graph, within the context of the following non-linear governing equation 2 for a steady state injected charge carrier density.

$$Q = I\tau_{recomb} = I(\tau_o/(1+[Q/Q_o]^n)) \quad (2)$$

Within equation 2, $\tau_o$ is a charge carrier lifetime at low carrier densities, n is a power law dependence of the charge carrier lifetime with injected charge carrier density and $Q_o$ is a fitting parameter determined by the dependence of charge carrier lifetime on the minority charge carrier concentration in a PIN diode. The power law dependence may be found to be 1, indicating a recombination process that scales proportionally with a charge carrier density. The above equation 2 can be obtained by the differential equation for an injected charge carrier in a PIN diode at steady state by setting dQ/dt=Q(t)−I/$\tau_{recomb}$=0. The results from equation 1 and equation 2 can be combined to obtain the Q(V) and dQ/dV as shown in FIG. 3, lower graph, within the context of equation 3.

$$dQ/dV = (dQ/dI)(dI/dV) = G(V)[\tau_o/(1+(1+Q)/Qo)] \quad (3)$$

Within equation 3, G(V) is a conductance of the PIN diode as obtained from equation 1.

The modeled and simulated charge carrier densities show excellent agreement, and thus may be regarded as verifying any of the foregoing assumptions. By biasing a PIN diode based micro-ring electro-optic modulator device at an optimal carrier injection efficiency point (near a maxima of equation 3), one can exploit the high charge carrier injection (fC/mV) of the modulator device to achieve a low voltage operation of the modulator device.

Figure 4:
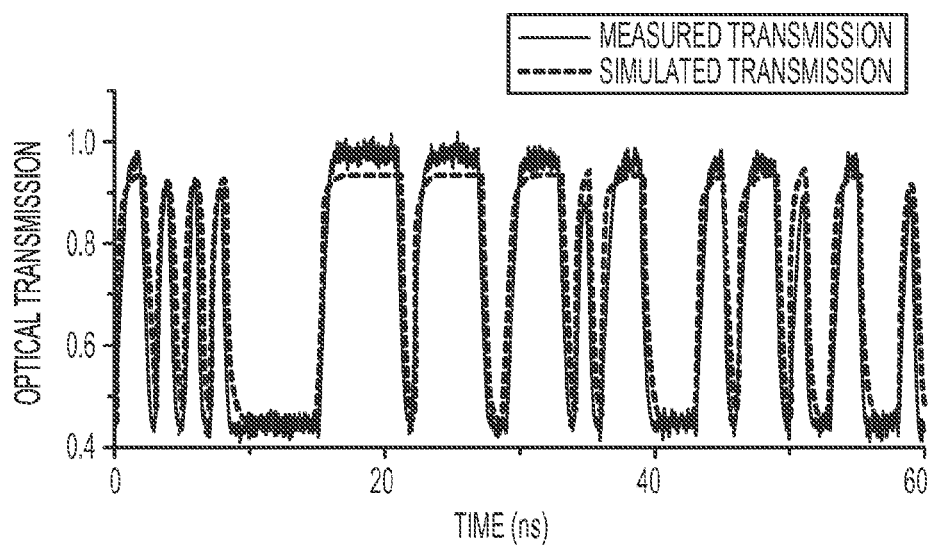
FIG. 4 illustrates good agreement between the measured (i.e., including enhanced fine structure peaks) and simulated (i.e., including flat topped peaks) waveforms for optical properties of a ring-waveguide electro-optic modulator device in accordance with the embodiments.

The transient charge carrier dynamics of a micro-ring electro-optic modulator device were simulated to verify the foregoing principle of operation. The electrical modeling was carried out in SILVACO ATLAS device simulation software and the optical modulation was calculated using an optical transmission matrix approach. The software models the internal physics of the modulator device by solving the Poisson equation and the charge continuity equation numerically. Also included were Shockley Read Hall (SRH), Auger, Direct recombination models. Assumed was an interface trap density of 10e10 per square centimeter per eV and an interface recombination rate of 10e4 centimeter per second. The surface recombination rate of silicon is of the order of 10e4 centimeter per second for unpassivated surfaces and 100 centimeter per second for passivated surfaces. A good agreement between the measured (i.e., including enhanced fine structure peaks) and simulated (i.e., including flat topped peaks) waveforms for optical properties of a ring-waveguide electro-optic modulator device in accordance with the embodiments can be observed in FIG. 4.

3. Ultra Low Voltage Swing Modulation in Charge Carrier Injection Modulators

Figure 5A:
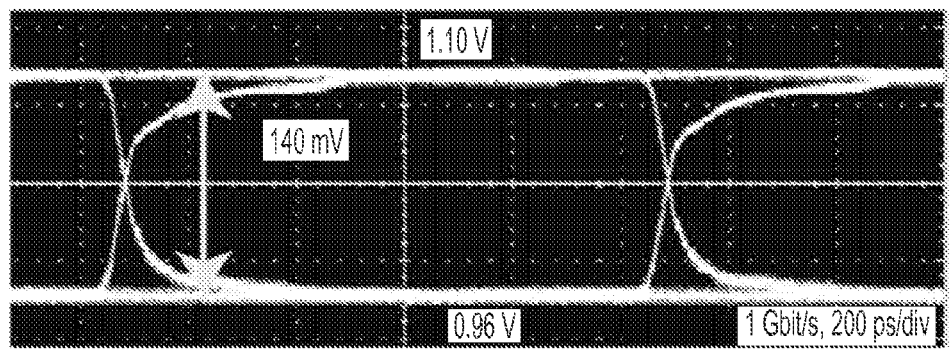
FIG. 5a shows an eye diagram corresponding to the drive voltage of the modulator device.
Figure 5B:
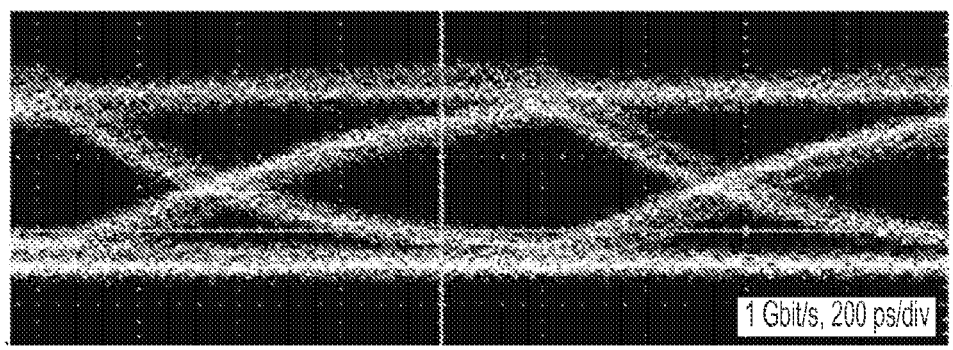
FIG. 5b shows the output optical waveform generated by the silicon micro-ring electro-optic modulator device at 1 Gbit/s NRZ, illustrating an open eye.

In accordance with the foregoing description, 1 Gbit/s modulation with a peak-peak drive voltage of only 150 mV has been demonstrated within a micro-ring electro-optic modulator device. An eye diagram corresponding to the drive voltage of the modulator device is shown in FIG. 5(a). The output optical waveform generated by the silicon micro-ring electro-optic modulator device at 1 Gbit/s NRZ is shown in FIG. 5(b). The electro-optic modulator device was driven directly from a pattern generator using a 20 dB attenuator to obtain a 150 mV voltage swing. A bias-tee was used to add a variable DC voltage to optimize the optical waveform. The driving signal was terminated in a 50 ohm termination at the end of a high speed probe to avoid reflections. A 150 mV voltage swing about a bias voltage level of 1.03 V was used to obtain clear waveforms. The optical eye diagram is shown in FIG. 5(b) illustrating an open eye. Symmetric rise and fall times of about 1 ns were observed corresponding with a recombination lifetime in silicon waveguides determined predominantly by surface recombination processes.

A radio frequency switching power consumed by the modulator device in accordance with the embodiments is estimated to be 7.9 fJ/bit excluding a state hold power. An estimate of a switching power may be determined by first considering that a total charge carrier injection times a voltage swing provides a switching energy per charge carrier injection. However, since 0-0, 0-1, 1-0, 1-1 transitions are all equally likely in a pseudo-random signal, a switching energy per bit is determined as ¼th of the switching energy per transition. A total charge injection for switching is estimated from an optical quality factor (Q ~3000), a group index ($n_g$=4.262) and modal volume of the cavity ($\Theta$=1.96 µm3) and a free carrier dispersion in silicon. The refractive index shift required for full optical switching across a ring waveguide in accordance with the embodiments is obtained from $\Delta n = n_g/Q_{opt}$=1.42e-3. This corresponds with an injected charge density of $\rho$=3.9e17 cm−3. Hence a total charge injected is $\Phi$=251 fC at each 0-1 transition for a modulator device in accordance with the embodiments. An energy per injection may therefore be about 37.7 fJ. However, since 0-0, 0-1, 1-0, 1-1 transitions are all equally likely in a pseudorandom signal, a switching energy per bit is determined as 7.9 fJ/bit. Also, it is noted that the total energy of a charge carrier injection modulator in accordance with the embodiments is dominated by a direct current power consumption which is determined by $V_{on} I_{on} = e V_{on} \rho \Theta Q/\tau_{recomb}$=267 µW.

Figure 6:
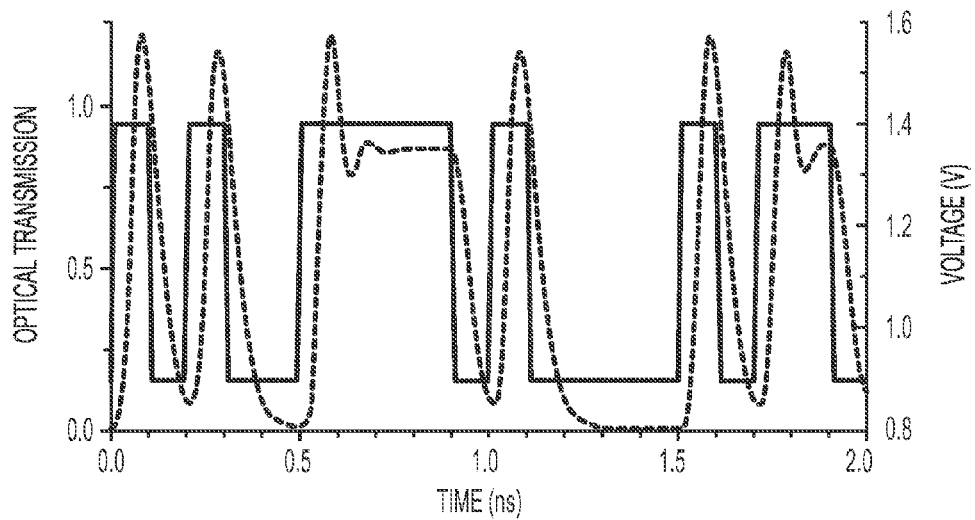
FIG. 6 shows a simulation of a 10 Gbps micro-ring electro-optic modulator device optical transmission (i.e., pointed top peaks) operation with a 500 mV voltage swing.

The principle of operation of a micro-ring electro-optic modulator device in accordance with the embodiments as described herein may also be extended to faster operating speeds. By controlling a charge carrier lifetime within a micro-ring within a micro-ring electro-optic modulator device in accordance with the embodiments, one may anticipate that a speed of a micro-ring electro-optic modulator device may be increased while still operating in a low drive voltage regime, with low loss micro-ring waveguides. In FIG. 6, there is show a simulation of a 10 Gbps micro-ring electro-optic modulator device optical transmission (i.e., pointed top peaks) operation with a 500 mV voltage swing (i.e., flat top peaks) by reducing an effective carrier lifetime. A Shockley Read Hall (SRH) recombination rate is increased such that the effective carrier lifetime is 100 µs. A diode IV forward bias resistance is 110 ohm and a micro-ring resonator loaded Q is 25,000, corresponding with a modest propagation loss of 17 dB/cm and a photon lifetime of 21 µs.

Figure 7:
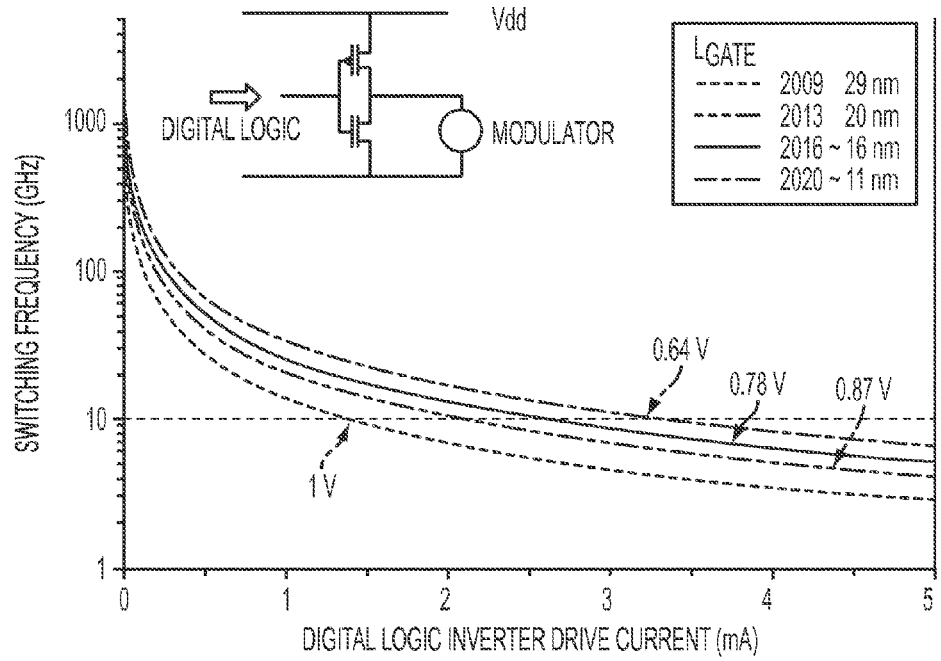
FIG. 7 shows a plot of the maximum switching speed of the direct logic drive as a function of the drive current for the modulator.

4. Extension to Direct Digital Complementary Metal Oxide Semiconductor Driven Modulators The proposed fabrication sequence in accordance with the embodiments may enable a high-speed direct digital logic driven micro-ring electro-optic modulator device that may be operated with a single stage (or tapered) inverter. A switching speed of a scaled single stage digital logic driver has been estimated. A maximum switching speed ($f_s = 1/t_{sw}$) for a single stage inverter (see, e.g., FIG. 7) driven by a minimum sized transistor may be estimated in accordance with equation 4.

$$t_{sw} = 3(C_n V_n/I_n)(I_{modulator}/I_n) + 1.5(C_n V_n/I_n) \qquad (4)$$

Within equation 4, $C_n$, $V_n$ and $I_n$ are the capacitance, voltage and current through minimum sized transistor at a given technology node, and $I_{modulator}$ is the peak current through the modulator. The maximum switching speed of the direct logic drive as a function of the drive current for the modulator is plotted in FIG. 7, where the operating voltages V decrease in concert with the gate lengths L. Gate lengths, voltages and delays are taken from ITRS 2009, Table PIDS2: High Performance Logic Technology Requirements, for exemplary purposes, although other source materials may be used. It is readily apparent that at 1 mA current levels for the present micro-ring electro-optic modulator device, switching speeds approaching 10 GHz may be realized using direct complementary metal oxide semiconductor logic drive transistors. An estimated scaled NMOSFET channel width for a 1 mA drive current is expected to be $G_{pmosfet} = G_{node} I_{modulator}/I_{d\,sat\,mode}$ an $I_{d\,sat}$ of 664 µA/µm at a 22 nm CMOS technology node. This implies a drive transistor size of 1.5 µm which can scale down with current densities. It is noted that the peak current in the device simulation shown in FIG. 6 is 3 mA, which corresponds with a scaled digital inverter cut-off bandwidth of 10 GHz in a 16 nm CMOS node. Such a reduction in footprint, driver energy and complexity may enable seamless integration of a micro-ring electro-optic modulator in accordance with the embodiments with CMOS nanoelectronics.

5. Summary

In summary, the embodiments demonstrate an ultra-low drive voltage (150 mV) operation of a charge carrier injection based micro-ring electro-optic modulator device in a Gbit/s regime in an ultra low mode volume (2 µm3) silicon modulator device. Such a low voltage driving scheme allows for a direct digital logic driven modulator driven with a micron sized transistor. An ability to scale the voltages of micro-ring electro-optic modulator devices down to few 100 mV may enable compatibility with future low voltage nanoelectronic technologies beyond 22 nm node CMOS, enabling close integration of nano-electro-optics with nanoelectronics.

6. Potential Application

Figure 8A:
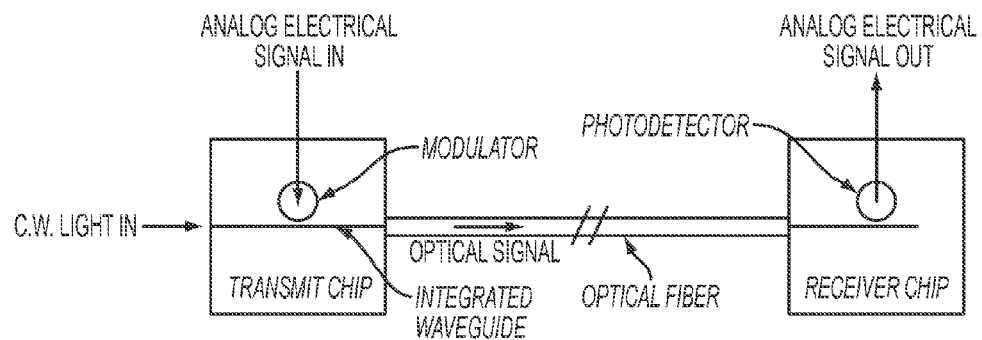
FIG. 8a shows schematic diagram of a communications apparatus that may include a micro-ring electro-optic modulator structure including a transmit chip in accordance with an embodiment.
Figure 8B:
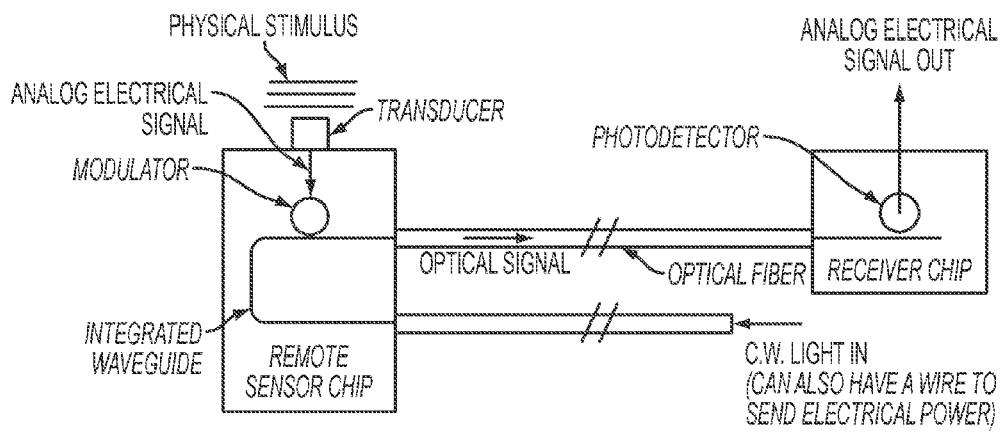
FIG. 8b shows schematic diagram of a communications apparatus that may include a micro-ring electro-optic modulator structure including a remote sensor chip in accordance with an embodiment.

FIG. 8(a) and FIG. 8(b) show schematic diagrams of communications apparatus that may include a micro-ring electro-optic modulator structure in accordance with the embodiments. The apparatus includes a transmit chip (i.e., FIG. 8(a)) or a remote sensor chip (i.e., FIG. 8(b)) that includes a micro-ring electro-optic modulator structure in accordance with the embodiments. Incident into an integrated waveguide within the transmit chip or remote sensor chip is a continuous wave light source. Also incident upon a PIN diode into which is embedded a ring waveguide within the transmit chip or remote sensor chip is an analog electrical signal which is captured by a micro-ring electro-optic modulator device that results from operation of the micro-ring electro-optic modulator structure and transmitted as an optical signal in conjunction with the continuous wave light source input. After travelling through an optical fiber the modulated optical signal is received by a receiver chip that demodulates the modulated optical signal while using a photodetector and provides as an output the same analog electrical output signal.

The apparatus that is illustrated in FIG. 8(a) or FIG. 8(b) provides advantages within the context of sending the analog electrical signal over long distances, with an immunity to electromagnetic interference and with a generally low complexity apparatus, depending upon a particular implementation of the apparatus that is illustrated in FIG. 8(a) or FIG. 8(b). The apparatus that is illustrated in FIG. 8(a) or FIG. 8(b) may include within the context of the transducer any device that converts a physical stimulus into an analog electrical signal. Such a physical stimulus may include, but is not necessarily limited to a light stimulus or a pressure stimulus. Examples of such transducers (or sensors) may include, but are not necessarily limited to, electrocardiograph (EKG) transducers or sensors, charge coupled device (CCD) array transducers or sensors and Hall effect transducers or sensors. The apparatus that is illustrated on FIG. 8(a) or FIG. 8(b) may thus be used to transmit a comparatively small voltage signal to or from a remote or distant location, or to or from a delicate environment.

The disclosed low voltage transduction of electrical signals to optical signal is of special interest in medical and harsh environment applications where the complexity of the transmitter electronics has to be minimized. For example, an application of a low voltage transducer with simplified front end electronics can be an optical transducer for EEG and ECG signals attached to the end of a catheter device. A particular RF optical fiber link is described in FIG. 8(a) and FIG. 8(b). A low voltage modulator will reduce the complexity of front end (i.e., distal end) of such a device/system.

All references, including publications, patent applications and patents cited herein are hereby incorporated by reference in their entireties to the extent allowed, as if each reference was individually and specifically indicated to be incorporated by reference and was set forth in its entirety herein.

The use of the terms "a" and "an" and "the" and similar referents in the context of describing the invention (especially in the context of the following claims) is to be construed to cover both the singular and the plural, unless otherwise indicated herein or otherwise clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise indicated.

No language in the specification should be construed as indicating any non-claimed element as essential to the practice of the invention.

It will be apparent to those skilled in the art that various modifications and variations can be made to the present embodiments without departing from the spirit and scope of the invention. There is no intention to limit the invention to the specific form or forms disclosed within the context of the embodiments, but on the contrary, the intention is to cover all modifications, alternative constructions and equivalents falling within the spirit and scope of the invention, as defined in the appended claims. Thus, it is intended that the present invention cover the modifications and variations of this invention provided they come within the scope of the appended claims and their equivalents.

What is claimed is:

1. An electro-optic structure comprising:
an intrinsic semiconductor material ring waveguide and an optically coupled strip waveguide that define an optical coupling location and are located at least in part contiguous with and extending from a semiconductor material layer located over a substrate;
a first doped region comprising a first dopant type located within at least a portion of the semiconductor material layer within the intrinsic semiconductor material ring waveguide; and
a second doped region comprising a second dopant type different than the first dopant type and located within at least a portion of the semiconductor material layer outside the ring waveguide on one side of the strip waveguide and opposite the optical coupling location on an opposite side of the intrinsic semiconductor material strip waveguide,
wherein the first doped region and the second doped region are electrically biased as electrodes at an optimal charge injection point so that a resulting PIN diode electro-optic device with the ring waveguide and the optical coupling region as an intrinsic region is configured to operate at a swing voltage less than about 500 millivolts; and
wherein the optimal charge injection point corresponds to a maximum of a charge carrier injection efficiency determined, as a function of the PIN diode bias voltage V, using the equation:

$$dQ/dV=(dQ/dI)(dI/dV)-G(V)[\tau_o/(1+(1+Q)/Q_o)]$$

where Q is an injected carrier density, $Q_o$ is a fitting parameter, I is a current through the PIN diode, G(V) is a conductance of the PIN diode, and $\tau_o$ is a charge lifetime.

2. The electro-optic structure of claim 1 wherein the swing voltage is about 150 millivolts or lower.

3. An electro-optic structure comprising:
an intrinsic ring waveguide located at least in part contiguous with and extending from a semiconductor material layer located over a substrate;
an intrinsic strip waveguide located adjacent to, and optically coupled with, the intrinsic ring waveguide over the substrate at an optical coupling location;
a first doped region comprising a first dopant type located within at least a portion of the semiconductor material layer inside the ring waveguide, and at a first side of the optical coupling location; and
a second doped region comprising a second dopant type different than the first dopant type located within at least a portion of the semiconductor material layer outside the ring waveguide, and at a second side of the optical coupling location opposite the first side of the optical coupling location, where the first doped region and the second doped region comprise electrodes within a PIN diode that includes the ring waveguide and the optical coupling location as an intrinsic region, and further wherein a charge carrier injection efficiency is determined, as a function of the PIN diode bias voltage, using the equation:

$$dQ/dV=(dQ/dI)(dI/dV)-G(V)[\tau_o/(1+(1+Q)/Q_o)]$$

where Q is an injected carrier density, $Q_o$ is a fitting parameter, I is a current through the PIN diode, G(V) is a conductance of the PIN diode, and $\tau_o$ is a charge lifetime.

4. The electro-optic structure of claim 3 wherein each of the first doped region and the second doped region is laterally recessed from a sidewall of the ring waveguide by a distance from about 200 to about 2000 nanometers.

5. The electro-optic structure of claim 3 wherein the semiconductor material layer comprises a monocrystalline silicon semiconductor material.

6. The electro-optic structure of claim 3 further comprising:
a passivation layer located upon the ring waveguide; and
a cladding layer located upon the passivation layer.

7. The electro-optic structure of claim 6 wherein:
the passivation layer comprises a conformal dielectric layer; and
the cladding layer comprises a planarized dielectric layer.

8. A method for fabricating an electro-optic structure comprising:
etching, while using a first etch method, an intrinsic ring waveguide and an adjacent optically coupled strip waveguide within an etched semiconductor material layer located over a substrate;
doping:
at least a portion of the etched semiconductor material layer inside the ring waveguide with a first dopant of a first dopant type to form a first doped region inside the intrinsic ring waveguide; and
at least a portion of the etched semiconductor material layer outside the intrinsic ring waveguide and on both sides of the intrinsic strip waveguide with a second dopant of a second dopant type different than the first dopant type to form a second doped region outside the intrinsic ring waveguide and on both sides of the intrinsic strip waveguide, wherein the first doped region and the second doped region serve as electrodes within a PIN diode that includes the intrinsic ring waveguide and the optically coupled intrinsic strip waveguide as an intrinsic region and
configuring the PIN diode to be biased to a maximum of a charge carrier injection efficiency determined, as a function of the PIN diode bias voltage V, using the equation:

$$dQ/dV = (dQ/dI)(dI/dV) - G(V)[\tau_o/(1+(1+Q)/Q_o)]$$

where Q is an injected carrier density, $Q_o$ is a fitting parameter, I is a current through the PIN diode, G(V) is a conductance of the PIN diode, and $\tau_o$ is a charge lifetime.

9. The method of claim 8 wherein the doping is effected by implanting through a screen layer to form at least one of the first doped region inside the ring waveguide and the second doped region outside the ring waveguide provides at least one of the first doped region inside the ring waveguide or the second doped region outside the ring waveguide with a volume concentration at a surface of the first doped region or the second doped region of at least about 1e19 dopant atoms per cubic centimeter.

10. The method of claim 8 wherein both the first doped region and the second doped region have a volume dopant concentration at least about 1e19 dopant atoms per cubic centimeter.

11. The method of claim 8 wherein only one of the first doped region and the second doped region has a volume dopant concentration at least about 1e19 dopant atoms per cubic centimeter.

12. The method of claim 8 further comprising thermally annealing the electro-optic structure after implanting at least one of the first doped region and the second doped region at a temperature of about 900 to about 1100 degrees centigrade for a time period from about 5 to about 30 seconds.

13. A method for operating an electro-optic modulator device comprising:
determining, for a PIN diode based electro-optic modulator structure comprising:
an intrinsic ring waveguide and an optically coupled intrinsic strip waveguide comprising an intrinsic semiconductor material located contiguous with and extending from a semiconductor material layer located over a substrate; and
a first doped region comprising a first dopant type located within at least a portion of the semiconductor material layer inside the intrinsic ring waveguide and separated from a second doped region comprising a second dopant type different than the first dopant type and located within at least a portion of the semiconductor material layer outside the ring waveguide and on both sides of the intrinsic strip waveguide
a charge carrier injection efficiency at an optimal point thereof as a function of a PIN diode bias voltage; and
operating the PIN diode based electro-optic device at a bias voltage electrical signal that corresponds to the optimal point of the charge carrier injection efficiency, in addition to a swing voltage electrical signal, both signals applied at the first doped region and the second doped region, wherein the charge carrier injection efficiency as a function of the PIN diode bias voltage is determined using the equation:

$$dQ/dV = (dQ/dI)(dI/dV) - G(V)[\tau_o/(1+(1+Q)/Q_o)]$$

where Q is an injected carrier density, $Q_o$ is a fitting parameter, I is a current through the PIN diode, G(V) is a conductance of the PIN diode, and $\tau_o$ is a charge lifetime.

14. The method of claim 13 wherein the determining the charge carrier injection characteristics into the ring waveguide as a function of the PIN diode bias voltage uses a simulation.

15. A communications apparatus comprising an electro-optic structure comprising:
an intrinsic ring waveguide located at least in part contiguous with and extending from a semiconductor material layer located over a substrate;
an intrinsic strip waveguide located adjacent to and optically coupled with the intrinsic ring waveguide over the substrate;
a first doped region comprising a first dopant type located within at least a portion of the semiconductor material layer inside the ring waveguide; and
a second doped region comprising a second dopant type different than the first dopant type and located within at least a portion of the semiconductor material layer outside the ring waveguide and on both sides of the intrinsic strip waveguide,
wherein the first doped region and the second doped region are configured as electrodes of a PIN diode that includes the intrinsic ring waveguide and the optically coupled intrinsic strip waveguide as an intrinsic region, and
wherein the PIN diode is biased to an maximum point of a charge carrier injection efficiency determined, as a function of the PIN diode bias voltage, using the equation:

$$dQ/dV = (dQ/dI)(dI/dV) - G(V)[\tau_o/(1+(1+Q)/Q_o)]$$

where Q is an injected carrier density, $Q_o$ is a fitting parameter, I is a current through the PIN diode, G(V) is a conductance of the PIN diode, and $\tau_o$ is a charge lifetime.

16. The communications apparatus of claim 15 wherein at least one of the first doped region and the second doped region has a volume concentration of the first dopant type or the second dopant type at a surface of the first doped region or the second doped region at least about 1e19 dopant atoms per cubic centimeter.

17. The communications apparatus of claim 15 wherein the substrate comprises an optical transmission chip within the communications apparatus.

18. The communications apparatus of claim 17 further comprising an optical receiver chip optically connected to the optical transmission chip through the strip waveguide.

19. The communications apparatus of claim 15 wherein the substrate comprises a remote sensor chip within the communications apparatus.

20. The communications apparatus of claim 19 further comprising an optical receiver chip optically connected to the optical transmission chip through the strip waveguide.

* * * * *